(12) United States Patent
Olivares

(10) Patent No.: US 9,327,623 B2
(45) Date of Patent: May 3, 2016

(54) ENERGY ABSORBING SEAT MECHANISM

(71) Applicant: Wichita State University, Wichita, KS (US)

(72) Inventor: Gerardo Olivares, Wichita, KS (US)

(73) Assignee: Wichita State University, Wichita, KS (US)

( * ) Notice: Subject to any disclaimer, the term of this patent is extended or adjusted under 35 U.S.C. 154(b) by 0 days.

(21) Appl. No.: 14/365,059

(22) PCT Filed: Dec. 14, 2012

(86) PCT No.: PCT/US2012/069789
§ 371 (c)(1),
(2) Date: Jun. 12, 2014

(87) PCT Pub. No.: WO2013/090744
PCT Pub. Date: Jun. 20, 2013

(65) Prior Publication Data
US 2014/0339866 A1 Nov. 20, 2014

Related U.S. Application Data

(60) Provisional application No. 61/576,748, filed on Dec. 16, 2011.

(51) Int. Cl.
*B60N 2/24* (2006.01)
*B60N 2/42* (2006.01)
*B60N 2/427* (2006.01)
*B64D 11/06* (2006.01)

(52) U.S. Cl.
CPC ............ *B60N 2/4242* (2013.01); *B60N 2/24* (2013.01); *B60N 2/42736* (2013.01); *B64D 11/0696* (2013.01); *Y10T 29/49826* (2015.01)

(58) Field of Classification Search
CPC ..... B60R 21/04; B60R 2021/343; F16F 7/12; B60N 2/4214; B60N 2/24; B60N 2/42; B60N 2/427
USPC .............................. 297/216.17, 64, 65.2, 68.1
See application file for complete search history.

(56) References Cited

U.S. PATENT DOCUMENTS

| 5,538,117 A | 7/1996 | Bouchez |
| 5,957,426 A * | 9/1999 | Brodersen ..................... 248/588 |

(Continued)

FOREIGN PATENT DOCUMENTS

WO    WO-2013090744 A1    6/2013

OTHER PUBLICATIONS

International Application Serial No. PCT/US2012/069789, International Search Report mailed Mar. 8, 2013, 4 pgs.

(Continued)

*Primary Examiner* — Pinel Romain
(74) *Attorney, Agent, or Firm* — Schwegman Lundberg & Woessner, P.A.

(57) ABSTRACT

A system includes a shear member and an energy absorber. The shear member is configured to couple a seat portion to a base structure of a vehicle. The shear member is configured to sustain a first load without fracture and configured to inelastically deform under a second load. The second load is greater than the first load. The energy absorber is coupled to the seat portion and coupled to the base structure. The energy absorber is configured to absorb the energy following deformation of the shear member.

19 Claims, 2 Drawing Sheets

(56) References Cited

U.S. PATENT DOCUMENTS

| | | | |
|---|---|---|---|
| 6,170,865 B1 * | 1/2001 | Barron | 280/735 |
| 6,637,712 B1 * | 10/2003 | Lagerweij | B60N 2/0705 248/429 |
| 7,618,076 B2 * | 11/2009 | Meynet et al. | 296/65.01 |
| 8,052,211 B2 * | 11/2011 | Nilakantan | B60N 2/4228 297/216.1 |
| 8,162,374 B2 * | 4/2012 | Cantor et al. | 296/68.1 |
| 8,398,141 B2 * | 3/2013 | Parker | B60N 2/0705 296/64 |
| 2010/0219667 A1 | 9/2010 | Merrill et al. | |
| 2011/0001033 A1 * | 1/2011 | Kohl et al. | 248/575 |
| 2011/0024958 A1 * | 2/2011 | Deml et al. | 267/131 |
| 2012/0217078 A1 * | 8/2012 | Kinsman | B60R 21/13 180/69.4 |
| 2013/0033056 A1 * | 2/2013 | Tunis et al. | 296/19 |

OTHER PUBLICATIONS

International Application Serial No. PCT/US2012/069789, Written Opinion mailed Mar. 8, 2013, 5 pgs.

"European Application Serial No. 12812460.9, Office Action mailed Aug. 22, 2014", 2 pgs.

"European Application Serial No. 12812460.9, Response filed Feb. 26, 2015 to Office Action mailed Aug. 22, 2014", 27 pgs.

"International Application Serial No. PCT/US2012/069789, International Preliminary Report on Patentability mailed Jun. 26, 2014", 7 pgs.

* cited by examiner

ENERGY ABSORBING SEAT MECHANISM

CLAIM OF PRIORITY

This patent application is a U.S. National Stage Filing under 35 U.S.C. 371 from International Application No. PCT/US2012/069789, filed on 14 Dec. 2012, and published as WO 2013/090744 A1 on 20 Jun. 2013, which claims the benefit of priority to U.S. Provisional Patent Application Ser. No. 61/576,748, entitled "ENERGY ABSORBING SEAT MECHANISM," filed on Dec. 16, 2011, which are hereby incorporated by reference herein in their entireties.

BACKGROUND

The costs associated with transportation-related accidents are a substantial burden on society. The costs include lost wages, acute and chronic medical care, and in some cases, death. Bystanders and vehicle occupants each sustain a portion of the costs. For example, vertical deceleration, such as that commonly associated with an aircraft accident, are noteworthy for the high compression loading on the spine.

Past efforts to provide greater protection for the benefit of, for example, car occupants have been inadequate. These efforts have included air bags, improved seat belts, and predetermined crumple zones in the vehicle. Even with these measures, occupants continue to be injured.

OVERVIEW

The present subject matter is directed to, among other things, a problem to be solved that can be described as finding a method and a system to reduce injury to an occupant subjected to a vertical load associated with a moving vehicle (such as an aerospace vehicle or a ground vehicle). For example, an aircraft (such as a fixed wing airplane or a helicopter) can be equipped in accordance with the present subject matter and provide protection to occupants. In addition to aerospace vehicles, the present subject matter can also be used on ground vehicles. In one example, a military vehicle can be configured to protect occupants in the event of a vertical load due to detonation of an explosive device.

In one example, the present subject matter can provide a solution to this problem, such as by using a shear member in combination with an energy absorbing member.

The shear member can be configured to inelastically fracture at a predetermined load. The energy absorbing member can be configured to dissipate the energy after fracture of the shear member. A seat mounting system including a shear member and an energy absorbing member can provide a level of protection to an occupant.

The shear member can include a pin, a disk, or a mechanical link. The energy absorbing member can include a spring, a cylinder (hydraulic or pneumatic), an energy absorbing structural member (such as a rubber component, a metallic component, or a composite component), or a metal or composite structure arranged to deflect or bend when subjected to a predetermined load. The energy absorbing member can absorb energy (such as that associated with an impact) by, among other things, deflection, torsion, or compression.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
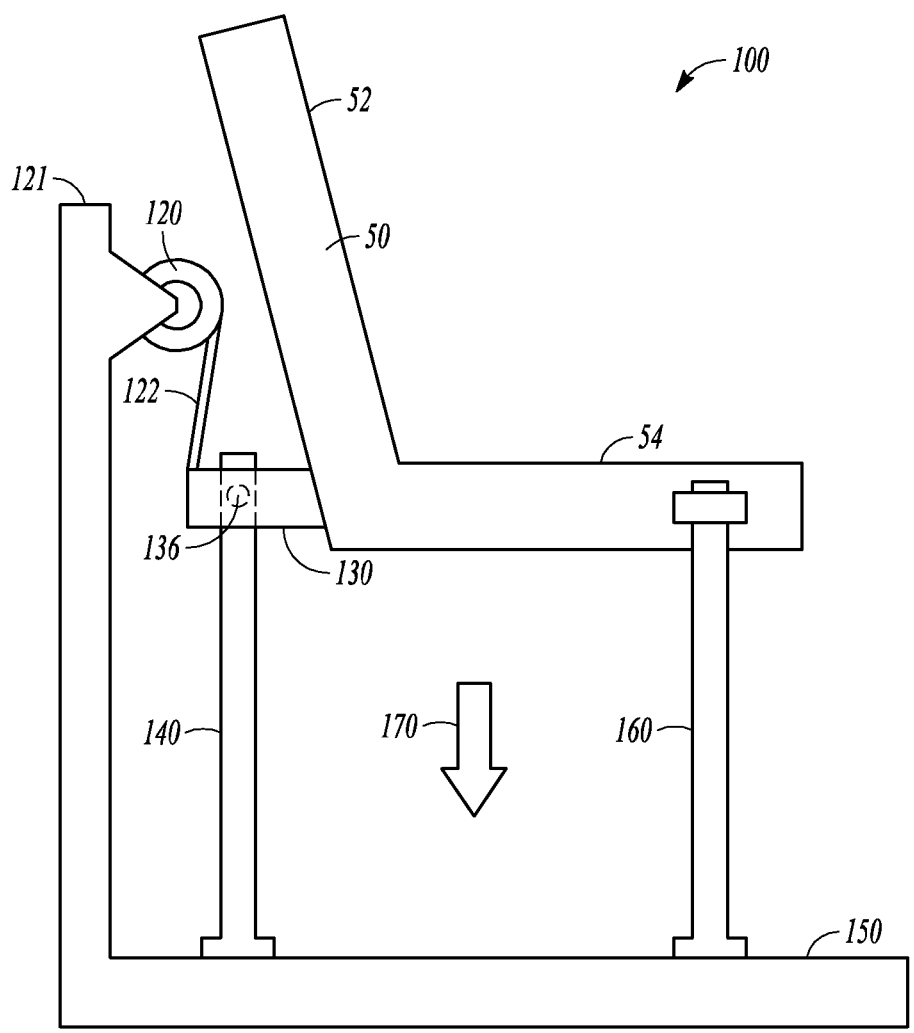
FIG. 1 includes an elevation view of a vehicle seat mounted to a structure, according to one example.

FIG. 1 includes an elevation view of system 100 including vehicle seat 50 mounted to structure 150, according to one example. System 100 can include an aerospace vehicle (such as an aircraft or a spacecraft) or an automobile.

Seat 50 includes back 52 configured to support an upper body of an occupant and includes bottom 54 configured to support the lower body of the occupant. Back 52 and bottom 54 are shown to have a fixed alignment in the example illustrated however, a joint coupling the back 52 and bottom 54 can allow for relative movement between the two.

Seat 50 is coupled to structure 150 by leg 140 and leg 160. Leg 140 and leg 160 are rigidly affixed to structure 150 at a lower end. In the example illustrated, leg 160 includes a linear bearing (or a sliding mechanism) to allow seat 50 to slide, relative to structure 150, in a downward direction, as shown by arrow 170, and to slide in an upward direction, that is, opposite that shown by arrow 170. Leg 140 and leg 160 provide a track along which seat 50 can travel.

Leg 140 includes a linear bearing 130 coupled to seat 50. Bearing 130, sometimes also referred to as a sliding mechanism, allows seat 50 to slide, relative to structure 150, in a downward direction, as shown by arrow 170, and to slide in an upward direction, that is, opposite that shown by arrow 170. Bearing 130 is coupled to leg 140 by pin 136. Pin 136, sometimes referred to as a shear pin, has an axis aligned perpendicular (or transverse) to the direction of sliding motion as shown by arrow 170.

Seat 50 is coupled to member 124 by energy absorber 120. Energy absorber 120, in the example illustrated, includes a retractor having belt 122. The retractor includes a clutch to arrest the pay out of belt 122 wound on a shaft. In the example illustrated, belt 122 is coupled to bearing 130 and arrests movement of seat 50 relative to support structure 150 along with member 124 in which seat 50 moves in the direction denoted by arrow 170.

In system 100, a shear pin provides a first threshold for loading. With increasing loading, pin 136 shears at the first threshold after which energy is dissipated by energy absorber 120. System 100 is configured to dissipate energy arising from an impact load according to a tailored energy profile. The tailored energy profile includes a threshold followed by a gradually dissipating profile. In this example, energy absorber 120 and shear pin 136 are separate assemblies and each can be independently field replaceable.

Figures 2A, 2B:
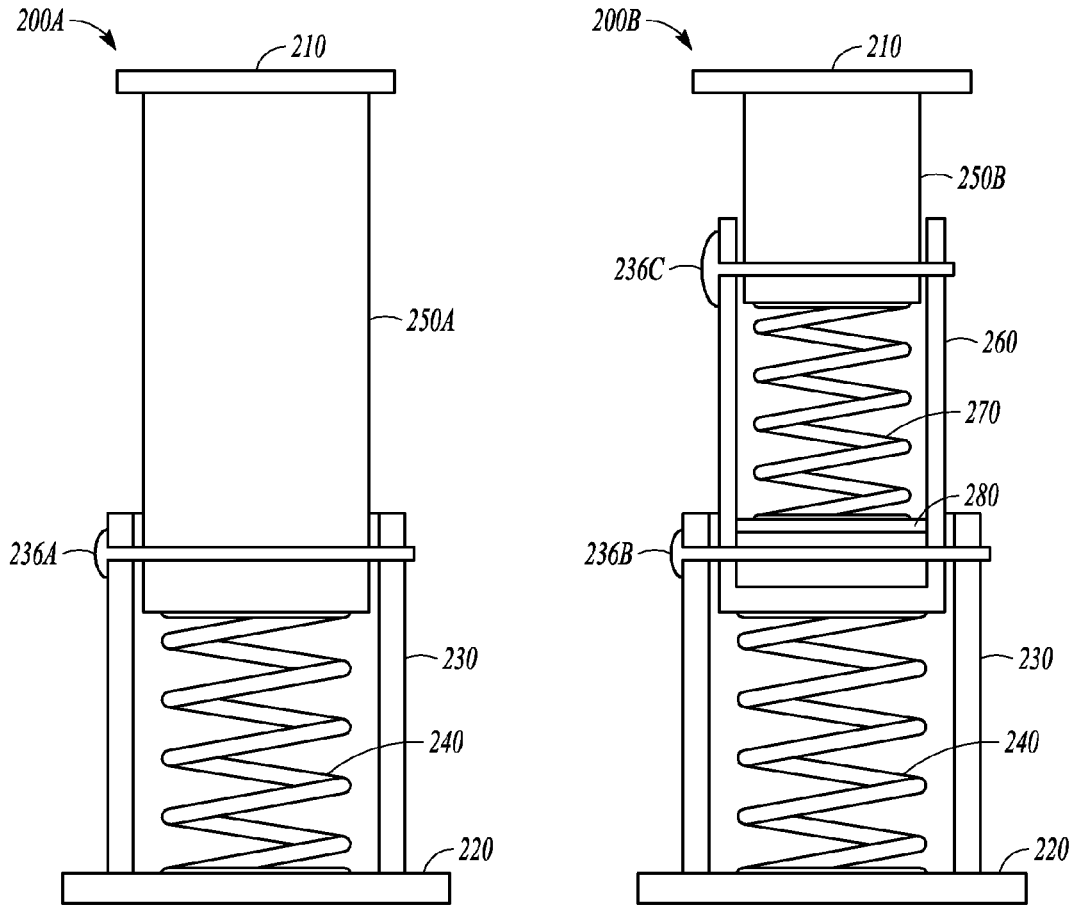
FIG. 2A and FIG. 2B illustrate components including a shear pin and an energy absorbing device, according to various examples.

FIG. 2A illustrates an example of a module 200A which includes shear pin 236A and energy absorber 240. In this example, module 200A includes first end 210 and second end 220. First end 210 and second end 220 are affixed to seat 50 (not shown in this figure) and support structure 150 (not shown in this figure). First end 210 is affixed to column 250A. As shown in the figure, column 250A is retained in a fixed position relative to receiver 230 by pin 236A. In addition, energy absorber 240 is disposed within receiver 230 between column 250A and second end 220. In the example shown, energy absorber 240 includes an idealized energy absorbing mechanism configured to oppose a compressive load exerted between column 250A and end 220. In operation, module 200A is configured to dissipate energy according to a predetermined profile based on shearing of pin 236A upon loading exceeding a predetermined threshold and thereafter to dissipate energy by compressing energy absorber 240.

The idealized energy absorbing mechanism can include a compression spring, such as a coil spring.

FIG. 2B illustrates an example of a module 200B which includes shear pin 236B, shear pin 236C, energy absorber 240, and energy absorber 270. Energy absorber 240 is positioned between end 220 and an end of intermediate section 260. Intermediate section 260 is configured to slidably engage with receiver 230. Energy absorber 240 dissipates energy following shearing of pin 236B.

Energy absorber 270 is positioned between an end of column 250B and an end of intermediate section 260. In the example shown, energy absorber 270 abuts false bottom 280. False bottom 280 isolates energy absorber 270 and energy absorber 240 in the example shown. Column 250B, terminated by end 210, is configured to slidably engage with intermediate section 260.

Pin 236C and energy absorber 270 are in series alignment relative to pin 236B and energy absorber 240. In the example shown, the energy absorbing profile can be tailored by selection of the spring rates and shear strength of the various elements. For example, the shear strength of pin 236C can be configured to be different (greater or lesser) than the shear strength of pin 236B. In similar manner, the spring rate of energy absorber 240 can be configured to be different (greater or lesser) than the spring rate of energy absorber 270.

Figure 3:
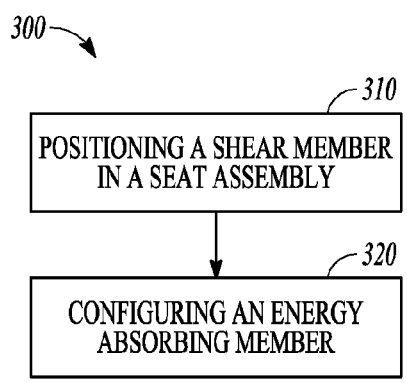
FIG. 3 includes a flow chart according to one example.

FIG. 3 illustrates method 300 according to one example of the present subject matter. Method 300 includes, at 310, positioning a shear member in a seat assembly. Positioning a shear member can include placing a pin in a manner to retain two elements (such as a seat and a support structure) in fixed alignment unless loaded with a force exceeding a predetermined shear force. Upon exceeding the predetermined shear force, the shear member is configured to sever or fracture in a manner to allow relative movement between the two elements. Method 300 includes, at 320, configuring an energy absorbing member to control movement as to the two elements. The energy absorbing member is configured to absorb energy at a time after fracturing the shear member based on relative movement as to the two elements.

The energy absorber can include a coil spring, a leaf spring, a hydraulic cylinder, a pneumatic cylinder, or a metallic and composite structural member configured to absorb energy under a torsional or lineal displacement. In some examples, the energy absorber includes an inertial reel with load limiting characteristics or other member to dampen relative movement between the elements. Other examples of an energy absorber are also contemplated.

The shear element can include an element configured to rupture or otherwise separate in a manner to allow unrestrained relative movement as to two elements. For example, the shear element can include a pin, a drum (having a surface configured to rupture at a predetermined load), or a ball and socket arrangement that allows movement after overcoming a spring force.

The number of shear elements and the number of energy absorbers is not limited. For example, two shear pins can be configured for use with a single energy absorber. In one example, the diameter and profile of a shear pin can be tailored to shear at a predetermined load. Multiple shear elements can be arranged in a serial or parallel order.

In various examples, module 200A or module 200B is configured to replace leg 140 and associated elements of system 100 (FIG. 1). In addition, more than one leg of seat 50 can be configured as described herein.

In one example, seat 50 travels along a linear track, as shown in FIG. 1. Other travel arrangements are also contemplated, including a curved path. For example, leg 160 (FIG. 1) can be replaced with a pivoting joint and leg 140 can be configured to accommodate motion along an arc.

Leg 140 can include a tubular structure. In other examples, leg 140 includes a formed channel, a square section, or other configuration.

In one example, the shear pin and the energy absorbing mechanism can be configured to provide protection to an occupant ranging from the $5^{th}$ to the $95^{th}$ percentile male and female population.

VARIOUS NOTES & EXAMPLES

Example 1 includes a system having a shear member and an energy absorber. The shear member is configured to couple a seat portion to a base structure of a vehicle. The shear member is configured to sustain a first load without fracture and configured to inelastically deform under a second load in which the second load is greater than the first load. The energy absorber is coupled to the seat portion and coupled to the base structure; the energy absorber is configured to absorb energy following deformation of the shear member.

In Example 2, the subject matter of Example 1 can optionally provide that the shear member includes a pin.

In Example 3, the subject matter of Example 2 can optionally provide that the first load and the second load are aligned along a load axis and wherein the pin has an axis aligned substantially perpendicular to the load axis.

In Example 4, the subject matter of any one of Examples 1 to 3 can optionally provide that the energy absorber includes a spring. In one example, the spring includes a spring-damper system.

In Example 5, the subject matter of any one of Examples 1 to 4 can optionally provide that the energy absorber includes a pneumatic cylinder.

In Example 6, the subject matter of any one of Examples 1 to 5 can optionally provide that the energy absorber includes a hydraulic cylinder.

In Example 7, the subject matter of any one of Examples 1 to 6 can optionally provide that the energy absorber includes a restraint configured to restrict movement of the seat portion relative to the base structure. In one example, the energy absorber can include a restraint configured to limit a load.

In Example 8, the subject matter of any one of Examples 1 to 7 can optionally provide that the restraint includes a track. In one example, the restraint includes a metallic or composite structural member configured to absorb the residual energy post-failure of a shear pin.

In Example 9, the subject matter of any one of Examples 1 to 8 can optionally provide that a second member is coupled to the seat portion and coupled to the base structure, the second member configured to deform under a third load.

Example 10 includes a method comprising positioning a shear member and configuring an energy absorbing member. Positioning the shear member can include positioning a shear member in a seat assembly. The shear member can be configured to sustain a predetermined load without fracture and configured to shear under a load in excess of the predetermined load. Configuring the energy absorbing member can include configuring to allow relative movement between the seat assembly and a structure and configuring to dissipate energy corresponding to the predetermined load.

In Example 11, the subject matter of Example 10 can optionally include positioning the shear member includes arranging a shear pin the seat assembly.

In Example 12, the subject matter of any one of Examples 10 to 11 can optionally provide that configuring the energy absorbing member includes configuring at least one of a spring, a hydraulic cylinder, and a pneumatic cylinder.

In Example 13, the subject matter of any one of Examples 10 to 12 can optionally include providing a track assembly to control the relative movement.

Example 14 includes a system having a vehicle, a seat assembly, a track assembly, a shear member, and an energy absorber. The vehicle is configured to convey an occupant. The seat assembly is configured to carry the occupant. The track assembly configured for coupling the vehicle and coupling the seat assembly, the track assembly is configured to control movement of the seat assembly relative to the vehicle. The shear member is coupled to the track assembly, wherein, when subjected to a force below a predetermined level, the shear member restricts movement of the seat assembly relative to the vehicle and wherein, when subjected to a force above the predetermined level, the shear member fractures and allows movement of the seat assembly relative to the vehicle. The energy absorber is coupled to the seat assembly. The energy absorber is configured to dissipate energy based on movement of the seat assembly relative to the vehicle.

In Example 15, the subject matter of Example 14 can optionally provide that the vehicle includes an aerospace vehicle or a ground vehicle.

In Example 16, the subject matter of any one of Examples 14 to 15 can optionally provide that the seat assembly includes a crewmember seat.

In Example 17, the subject matter of any one of Examples 14 to 16 can optionally provide that the track assembly includes at least one guide and a channel.

In Example 18, the subject matter of any one of Examples 14 to 17 can optionally provide that the shear member includes a pin.

In Example 19, the subject matter of any one of Examples 14 to 18 can optionally provide that the energy absorber includes a shock absorber.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with U.S. 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system including:
    a shear member configured to couple a seat portion to a base structure of a vehicle, the shear member configured to sustain a first load without fracture and configured to inelastically deform under a second load, the second load greater than the first load; and
    an energy absorber coupled to the seat portion and coupled to the base structure, the energy absorber configured to absorb energy following deformation of the shear member.

2. The system of claim 1 wherein the shear member includes a pin.

3. The system of claim 2 wherein the first load and the second load are aligned along a load axis and wherein the pin has an axis aligned substantially perpendicular to the load axis.

4. The system of claim 1 wherein the energy absorber includes a spring.

5. The system of claim 1 wherein the energy absorber includes a pneumatic cylinder.

6. The system of claim 1 wherein the energy absorber includes a hydraulic cylinder.

7. The system of claim 1 wherein the energy absorber includes a restraint configured to restrict movement of the seat portion relative to the base structure.

8. The system of claim 1 wherein the restraint includes a track.

9. The system of claim 1 further including a second member coupled to the seat portion and coupled to the base structure, the second member configured to deform under a third load.

10. A method comprising:
- positioning a shear member in a seat assembly, the shear member configured to sustain a predetermined load without fracture and configured to shear under a load in excess of the predetermined load; and
- configuring an energy absorbing member to allow relative movement between the seat assembly and a structure and configured to dissipate energy corresponding to the predetermined load.

11. The method of claim 10 wherein positioning the shear member includes arranging a shear pin the seat assembly.

12. The method of claim 10 wherein configuring the energy absorbing member includes configuring at least one of a spring, a hydraulic cylinder, and a pneumatic cylinder.

13. The method of claim 10 further including providing a track assembly to control the relative movement.

14. A system comprising:
- a vehicle configured to convey an occupant;
- a seat assembly configured to carry the occupant, a track assembly coupling the vehicle and coupling the seat assembly, the track assembly configured to control movement of the seat assembly relative to the vehicle;
- a shear member coupled to the track assembly, wherein, when subjected to a force below a predetermined level, the shear member restricts movement of the seat assembly relative to the vehicle and wherein, when subjected to a force above the predetermined level, the shear member fractures and allows movement of the seat assembly relative to the vehicle; and
- an energy absorber coupled to the seat assembly, the energy absorber configured to dissipate energy based on movement of the seat assembly relative to the vehicle.

15. The system of claim 14 wherein the vehicle includes an aerospace vehicle or a ground vehicle.

16. The system of claim 14 wherein the seat assembly includes a crewmember seat.

17. The system of claim 14 wherein the track assembly includes at least one guide and a channel.

18. The system of claim 14 wherein the shear member includes a pin.

19. The system of claim 14 wherein the energy absorber includes a shock absorber.

* * * * *